July 25, 1944.   A. E. WEBB   2,354,562
HYDRAULIC TESTING MACHINE
Filed July 6, 1940   3 Sheets-Sheet 1
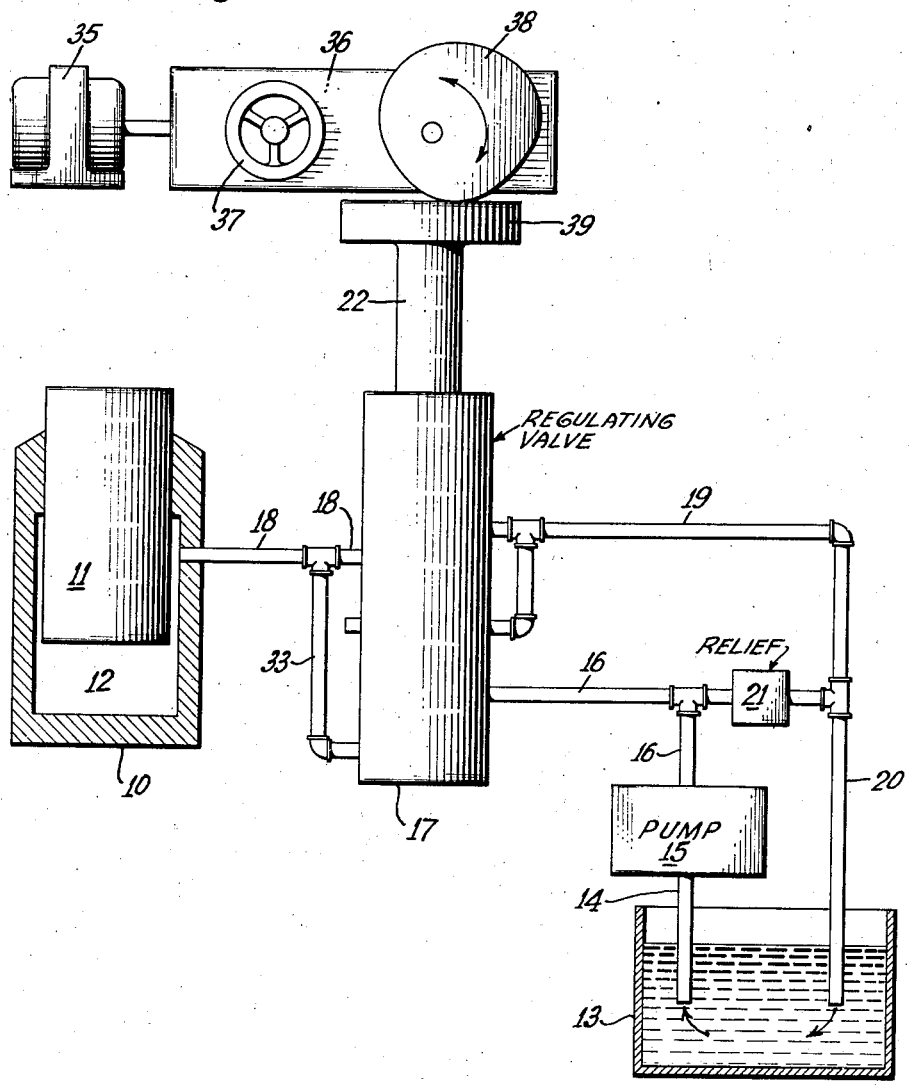
INVENTOR
ALBERT E. WEBB
BY
ATTORNEY

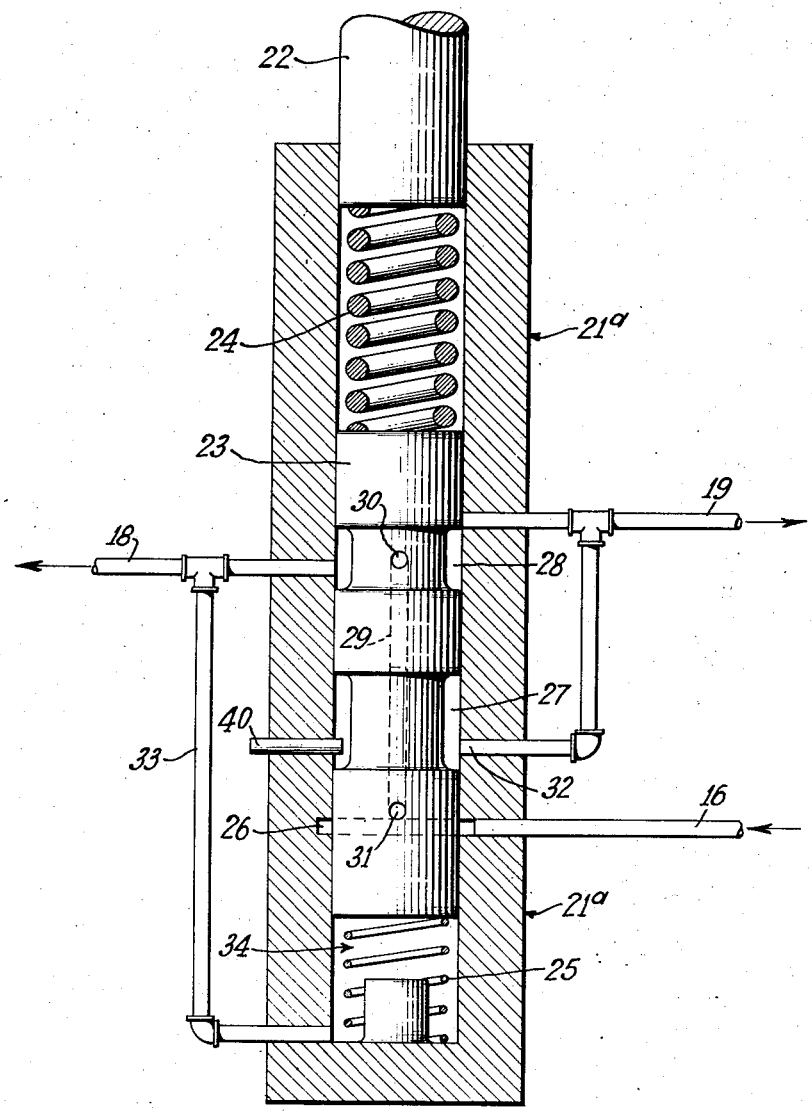

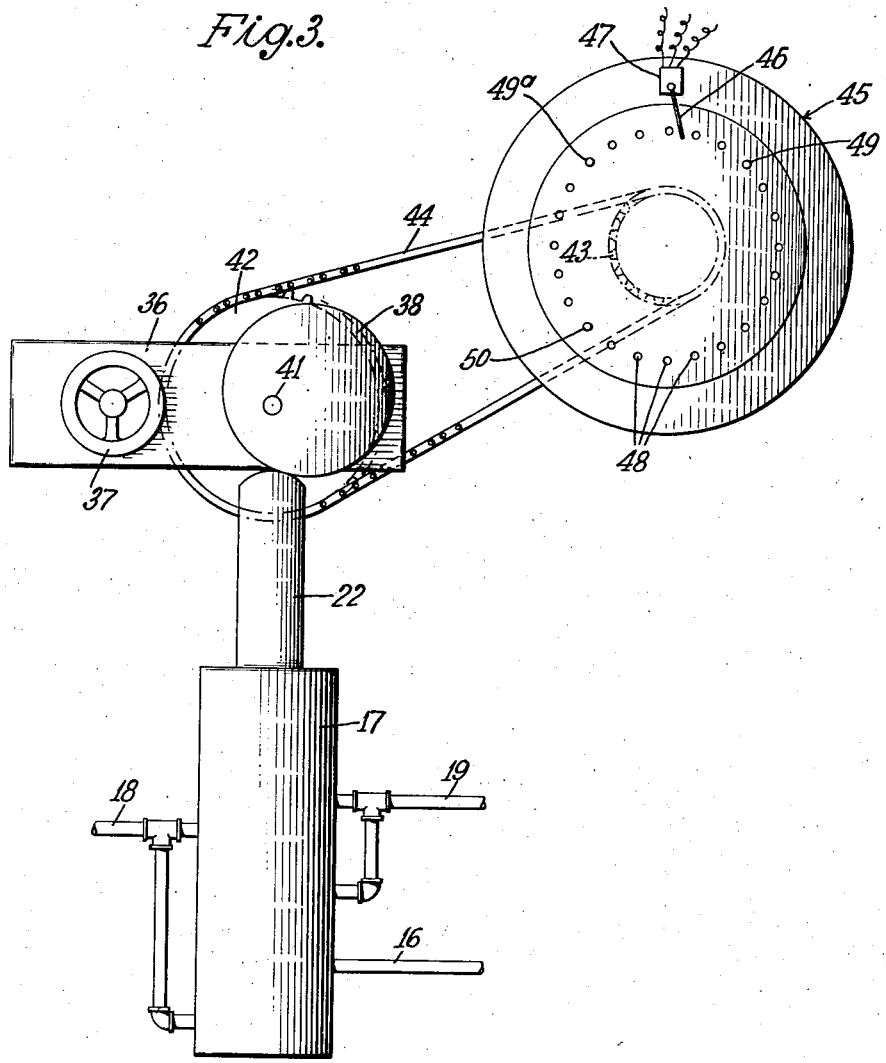

Patented July 25, 1944

2,354,562

UNITED STATES PATENT OFFICE 2,354,562

HYDRAULIC TESTING MACHINE

Albert E. Webb, Moline, Ill., assignor to American Machine and Metals, Inc., New York, N. Y., a corporation of Delaware Application July 6, 1940, Serial No. 344,221

6 Claims. (Cl. 265—14)

This invention relates to a hydraulic testing machine and more particularly to a machine of the character described capable of applying a load to the specimen at a predetermined rate of load, that is a predetermined rate of increase of pressure as a function of the time regardless of the amount of yield or deformation of the specimen to be tested.

It is a further object to provide a machine of the character described in which the rate of increase of the load may be regulated at will.

In the making and operation of testing machines difficulty has been experienced in obtaining comparable results on the different specimens. The standard testing machines have been capable of applying a standard rate of increase of load so long as the yield of the specimen is along a straight line curve, that is as long as it is a direct function of the time but many materials have a variable rate of deformation and all materials increase in deformation very materially when the elastic limit has been reached and before actual failure. The existing machines do not maintain the predetermined rate of pressure increase while the specimens are yielding. It follows that if different specimens yield at different points that the rate of application of the load of the one specimen is not comparable to that of the other. Under such circumstances the data taken under this condition of loading do not represent comparable characteristics of the material being tested. This variation is especially noticeable under tensile stress. Even in conventional machines having a constant rate of deformation stiff specimens are loaded very rapidly while flexible specimens are loaded slowly.

It is a further object of this invention to provide a fixed rate of loading which will be independent of the yield and which will therefore be free from the disadvantages resulting from a poorly controlled rate of loading.

This invention comprises generally, therefore, a testing machine of the generally hydraulic type having means for insuring that the oil pressure shall increase in pressure as a fixed function of the time regardless of the quantity of oil required to produce such pressure.

It is a further object of this invention to provide a device in which the specimen may be repeatedly stressed and relieved from stress in alternation, according to any predetermined plan, as for example where it is desired to determine the fatigue of the specimen under repeated stress.

In the particular embodiment disclosed the oil pressure is balanced against a spring and means are provided for increasing the pressure on the spring at a uniform rate, as by a motor drive, and the spring itself actuates a valve which is balanced against the pressure to cut off the supply of fluid under pressure or to relieve it as may be necessary to maintain the fixed pressure.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Fig. 1 is a diagrammatic elevation illustrating this invention.

Fig. 2 is a central vertical section through the regulating valve shown in Fig. 1.

Fig. 3 is an elevation of a modified form of the time controlling device having means for applying the stress repeatedly.

As shown in the drawings, the device comprises essentially a pressure responsive element which may be of any form but which, for convenience of illustration, is herein shown as a cylinder 10 in which operates a piston 11 comprising the load cylinder of the testing machine. The apparatus for supporting the work to be tested forms no part of this invention and is not here illustrated. It will be of standard construction, as will be understood. Beneath the piston 11 is a chamber 12 adapted to receive the working fluid. The invention also involves some means of supplying liquid under pressure and some place into which the liquid may be discharged after the pressure has been expended. For purposes of illustration we have chosen a closed system in which liquid is taken from a sump brought under pressure by a pump and discharged again into the sump. As shown, therefore, the number 13 comprises a sump or well from which the liquid is fed through a conduit 14 by a pump 15 which delivers the liquid to the cylinder 10 by a conduit 16, a control valve 17 and a conduit 18. Liquid is returned to the sump from the control valve by conduits 19 and 20 and a relief valve 21 permits the by-passing of liquid from the conduit 16 to the conduit 20. This relief valve may be either hand controlled or automatically controlled but will usually be automatically controlled.

The control valve 17 comprises, as shown, a cylinder 21a in which there moves a piston 22 by which the control load is applied and a slide valve 23, both of which fit tightly but slidably within the cylinder. Between the piston 22 and the valve 23 is a loading spring 24 and below the valve 23 is a light spring 25 adapted to raise the valve whenever it is relieved of load. The interior of the cylinder is provided at its lower portion opposite the in-put conduit 16 with a circumferential recess or chamber 26 and the valve 23 is provided with circumferential grooves forming chambers 27 and 28. A vertical bore 29 axially disposed in the valve connects at 30 with the chamber 28 and is provided at its lower end with an opening 31 to the outside of the valve which, in one position of the valve, will discharge into the chamber 26. The conduits 18 and 19 discharge into the interior of the cylinder one above the other so that in one position of the valve the conduit 19 is cut off but the conduit 18 is still in communication with the opening 30, while in another position of the valve the conduits 18 and 19 are connected together. The chamber 27 is so disposed that in the lowermost position of the valve it may afford communication between the chamber 26 and an outlet 32 which communicates with the return oil conduit 19. A passageway here shown in the form of a conduit 33 is provided between the conduit 18 and the chamber 34 below the valve 23 so as to maintain, below the valve 23, a pressure equal to the pressure within the cylinder 10.

The numeral 35 comprises an electric motor which, through a suitable reduction gear 36 controlled by a hand wheel 37 operates a cam 38 bearing upon a head 39 of the piston 22. As will be readily understood, the cam 38 will rotate at a constant speed which may be determined by the wheel 37. The cam 38 itself is so designed as to move the head 39 in accordance with the predetermined pressure curve determined for the machine. This may be determined either by calculation from the strength of the spring and the speed and shape of the cam or it may be determined empirically.

Means are preferably provided to limit the movement of the valve 23. As shown, a pin 40 extends through the cylinder wall within the recess 27 in position to prevent the valve from rising too high when the spring 24 is unsprung.

The operation of the device is as follows:

Oil is forced into the cylinder 10 from the sump 13 by the pump 15, as previously described, flowing from the chamber 26 through the conduit 29 into the chamber 28 and hence into the conduit 18 and to the cylinder. The pressure within the cylinder is also imparted below the valve 23 into the chamber 34. As soon as this pressure within the chamber 34 is sufficient to overcome the pressure of the spring 24 the valve 23 is raised, cutting off communication between the opening 31 and the chamber 26 and thus stopping the flow of liquid to the cylinder 10.

When the resistance of the piston 11 reaches the point for which the cam 38 is set the pressure in the chamber 34 is built up to the point again to raise the valve 23 to cut off the flow of high pressure liquid at 31.

Should for any reason the pressure in the chamber 34 increase above that of the spring 24 it will raise the valve 23 to afford communication between the conduit 18 and the low pressure conduit 19, permitting a portion of the oil in the cylinder to escape to the sump.

Should the pressure in the main cylinder drop abruptly, as in the case where a specimen abruptly ruptures, particularly a specimen under tension, the pressure in the chamber 34 immediately falls to zero and the valve 23 is forced downwardly to its bottommost position by the spring 24. This shuts off the conduit 18 absolutely, while at the same time the chamber 27 affords communication between the chamber 26 and the relief chamber 32 so that the high pressure liquid from the pump is short circuited back to the sump.

This action locks the piston of the main press at the point where the rupture occurred. The press is now in locked position and cannot be operated again until the pressure on the spring 24 is relieved, as for example by returning the cam 38 to its neutral position.

With the foregoing construction it will be clear that the pressure within the cylinder is built up as a function of time, the precise function being determined by the contour and speed of rotation of the cam 38 and that during this building up of the pressure, the cylinder is automatically connected either to pressure or exhaust, whichever is required precisely to maintain the pressure for which the instrument is instantaneously set. As soon, however, as rupture occurs and there is a sudden relief in the pressure in the cylinder, and hence in the chamber 34, the valve will automatically freeze the pressure piston in position and no further movement will occur until the instrument is reset.

In the form of the invention illustrated in Fig. 3 a driving mechanism is provided for reversing the motor drive of the cam 38 at predetermined intervals in order to subject the specimen to repeated stresses. The most desirable form of repeated stress to which it is usually desired to subject the specimen is a repetition of the same stress at regular intervals separated by a relief of the stress to zero or to a predetermined point. For this reason I have chosen that form of the invention to illustrate, although it will be obvious, that an irregular repetition or a regular repetition of stress in increasing amounts can be provided, if desired.

As here shown, the pressure responsive device and valve mechanism are in full accordance with the previous embodiment, the valve 17 having the piston valve 22 controlled by the cam 38, which in turn is driven by the timing mechanism 36 controlled by wheel 37.

In this construction there is provided on the shaft 41 on which the cam 38 is mounted, a sprocket wheel 42 which in turn drives sprocket wheel 43 by means of a chain 44. Mounted coaxially with the sprocket 43 is a disc 45 which is driven by the sprocket wheel 43. This disc is provided with a device which may engage an arm 46 of a reversing switch 47 after the disc has turned through a predetermined angle. This may be accomplished by providing a series of sockets 48 circumferentially spaced around the disc into which pins 49 and 50 may be inserted, the sockets being so disposed that as the disc is rotated the pins will engage arm 46 of the switch 47 to operate the switch to reverse the direction of motion of the driving motor of the timing mechanism 36.

Of course any form of gear train may be used to drive the current reversing device but I prefer to make the gear ratio such that the disc 45 will make substantially a complete revolution while the cam 38 is turning through its maximum useful angle.

Each position of the disc 45 corresponds to a definite position of the cam 38 and hence to a definite pressure which the device is set to maintain. It is thus possible to mark the various sockets 48 with the actual pressure with which they correspond. This marking may be in terms of the liquid pressure if the device is intended to be used with various pressure responsive devices, but normally I would prefer that these markings read directly in terms of the actual pressure exerted upon the test specimens.

With this construction it will be clear that if it is desired to subject the specimen to a repeated stress varying from zero to 30,000 pounds once each minute that the pins 49 and 50 may be set in the sockets corresponding to pressures of zero and 30,000 pounds respectively.

The timing mechanism is then set to bring the cam from the zero position to the 30,000 pound position in one-half minute and the device is put in operation. The timing mechanism will thereafter rotate the cam 38 gradually increasing the pressure on the specimen until the 30,000 pound position has been reached, whereupon the pin 50 engaging the arm 46 will reverse the rotation of the cam 38 and reduce the pressure, at the same time reversing the motion of the disc 45 and this action will continue until the pin 49 again strikes the arm 46 to operate the reversing mechanism.

If desired, the reversing movement of the timing mechanism may be at higher speed than the forward motion. This may be accomplished by installing any quick action reverse mechanism such as are well known in the art.

If it should be desired to relieve the stress, say only to 15,000 pounds instead of to zero, the pin 49 will be put in the 15,000 pound socket, as shown at 49a, instead of in the zero socket after the disc 45 has rotated far enough to make that socket pass the arm 46, whereupon the reversing takes place when the stress has been relieved to the 15,000 pound minimum instead of at zero. Obviously, also, the pin 49 may be designed to be yieldable in one direction, according to well known principles, so that it may be inserted in its socket at the beginning of the test.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A testing machine comprising a pressure responsive plunger in a cylinder imparting stress to a specimen to be tested, a supply of fluid under pressure and a sump for the expended fluid, means including a control valve having a cylinder, a piston valve moving in the cylinder, a load spring for moving said piston valve in one direction, means for admitting liquid from the testing machine cylinder to the side of the piston valve opposite said spring for moving said piston valve in the other direction in response to pressure in said testing machine cylinder, means for imparting a predetermined pressure upon said spring, said piston valve having ports constructed and arranged in its lowermost position to shut off all connection of the testing machine cylinder to fluid supply or sump and to short circuit the supply of fluid under pressure to the sump and in an intermediate position to afford communication between the supply of fluid under pressure and said testing machine cylinder and in the upper position between sump and said testing machine cylinder and a spring of less strength than the load spring for moving said piston valve from said first position to said third position when pressure on the load spring is released.

2. A control mechanism for a testing machine hydraulically loaded by a pump and having a sump for spent liquid, the control mechanism including in combination, a cylinder, a piston valve moving in said cylinder, a load spring for moving said piston valve in one direction, means for admitting liquid from the machine cylinder to the other side of the piston valve from said spring for moving said piston valve in the other direction in response to pressure in said machine cylinder, means for imparting a predetermined pressure upon said spring, said piston valve having ports constructed and arranged in its lowermost position to shut off all connection of the machine cylinder to sump or pump and to short circuit the pump and in an intermediate position to afford communication between the high pressure side of said pump and said machine cylinder and in the upper position between the sump and said machine cylinder and a spring of less strength than the load spring for moving said piston valve from said first position to said third position when pressure on the load spring is released, a cam adapted to engage the means for imparting pressure upon said spring, an electric motor and a reduction gear for moving said cam, said cam being constructed and arranged to vary the pressure upon said spring in accordance with a predetermined pressure curve.

3. In connection with the control of fluid to a hydraulically stressed testing machine wherein the stress upon the specimen is controlled by the stress upon a load spring, in combination, a hydraulic cylinder, a sump, a pump drawing from the sump, a valve body, connections from the valve body to the cylinder, to the pump, and to the sump, a cylindrical valve element having grooves coacting with ports in the valve body, a load spring moving the cylindrical valve in one direction, a spring lighter than the load spring tending to move the valve in the opposite direction, a back pressure connection to the cylinder assisting the lighter spring, the ports and grooves being so arranged that when the lighter spring, assisted by the back pressure overbalances the load spring, a bypass is opened connecting the cylinder with the sump through one of the grooves in the valve and when the load spring partly overcomes the combined back pressure and the lighter spring the pump is connected through the valve body to the plunger, but when the load spring completely overcomes the lighter spring, as when the specimen breaks, the valve connects the pump to the sump and cuts the cylinder off from both the pump and the sump.

4. A hydraulic testing machine wherein the ram is locked in the position it has reached when the specimen under test breaks, having, in combination, a cylinder, a ram movable in the cylinder for stressing the specimen, a control valve body, a valve movable in the valve body which has a first, a second, and a third operating position; a chamber exerting pressure on the valve biasing it toward the first position, a connection from one port in the control valve body to the cylinder and to the chamber, connections from other ports in the valve body to a sump and to a source of fluid under pressure respectively, a loading spring tending to move the valve from the first toward the second and third position, connections through the valve body when the valve is in its first position permitting the slow escape of fluid from the cylinder and chamber to the sump thereby tending to reduce the resistance of the chamber to the movement of the valve by the loading spring from the first to the second position, connections through the valve body when the valve is in its second position supplying fluid under pressure to the cylinder and the chamber increasing the pressure in the chamber tending to return the valve to the first position; connections through the valve body when the valve is in its third position which will trap the fluid in the cylinder and connect the fluid supply under pressure to the sump, the loading spring being able to drive the valve from the first through the second to the third position only when the counterpressure in the chamber falls suddenly as when all the pressure in the chamber, by the rupture of the specimen, is released, preventing the movement of the valve between first and second position from equalizing the pressure in the cylinder and that of the loading spring before the valve moves through the second to the third position.

5. A hydraulic testing machine in accordance with claim 4 in which the stress exerted on the specimen is determined by a loading spring, characterized by means for varying the pressure exerted by the loading spring according to a pressure-time curve, these means including an electric motor, a reduction gear system driven by the motor, a cam driven by the reduction gear, means whereby the cam controls the pressure of the loading spring.

6. A testing machine having in combination a pressure-responsive element for imparting stress to a specimen to be tested, a supply of fluid under pressure, a sump for spent fluid, a control body connected to all three, a valve movable in the control body having a first and second position, ports in the control body adapted to connect the pressure-responsive elements to the fluid supply when the valve is in its first position and with the sump when it is in its second position, a spring in the control body biasing the valve toward the second position, a stress-controlling means comprising a loading spring that tends to move said valve to its first position, a timing motor, means driven by the timing motor for exerting pressure on the loading spring varying in accordance with a predetermined pressure time cycle, adjustable stops on said stress-controlling means, a reversing switch alternately engaged by each of said stops controlling the timing motor so that a selected part of a predetermined pressure time cycle may be applied to the specimen to increase the stress and then to decrease the stress in reverse manner and to repeat this cycle indefinitely.

ALBERT E. WEBB.